US005878681A

United States Patent [19]

Asami

[11] Patent Number: 5,878,681

[45] Date of Patent: Mar. 9, 1999

[54] EMBROIDERER TRANSFER

[76] Inventor: Katsuyuki Asami, No. 725-1 Maegasu Shinden-Nokata, Yatomi-cho Ama-Gun, Aichi-Ken, Japan

[21] Appl. No.: 861,966

[22] Filed: May 22, 1997

[51] Int. Cl.[6] .......................... D05C 71/00; D04D 07/04; B32B 07/08

[52] U.S. Cl. ....................................... 112/475.18; 112/439

[58] Field of Search .......................... 112/475.18, 475.22, 112/475.23, 439; 428/122, 96, 27, 224, 133; 156/93, 250, 537

[56] References Cited

U.S. PATENT DOCUMENTS

| | | | |
|---|---|---|---|
| 889,614 | 6/1908 | Johnson | 112/475.18 |
| 4,092,451 | 5/1978 | Sernaker | 112/475.18 X |
| 4,517,910 | 5/1985 | Jalowsky | 112/475.18 X |
| 5,241,919 | 9/1993 | Lagreca | 112/475.23 X |
| 5,531,176 | 7/1996 | Johnson | 112/439 X |

*Primary Examiner*—Ismael Izaguirre
*Attorney, Agent, or Firm*—Jenkens & Gilchrist, P.C.

[57] ABSTRACT

An embroidery method for transferring or securing one or more embroidery designs onto an article. A design-bearing embroiderer is produced by forming at least one design on a base material of suitable density and heat solubility, backing up the base material with a binder material having a peel-off sheet, trimming the margins off the designs and affixing a heat/pressure resistant protective layer thereon. The embroiderer is placed on an article after removing the peel-off sheet. By hot-pressing the embroiderer, the binder material melts and is affixed to the underlying article. The protective layer is then removed from the embroiderer after so securing the designs.

28 Claims, 2 Drawing Sheets

EMBROIDERER TRANSFER

BACKGROUND OF THE INVENTION

1. Technical Field of the Invention

The present invention relates generally to ornamental designs and methods of production therefor, and more particularly, to systems and methods for producing embroidered designs which are readily transferrable to various articles.

2. Description of Related Art

Embroidered designs have gained tremendous popularity in recent times for their obvious aesthetic appeal. This gain in popularity has led to increased interest in techniques for producing embroidered designs and embroidered articles.

One conventional method for making an embroidered article involves embroidering a design directly on an article, such as a garment, using a sewing machine. In ordinary practice, this method involves embroidering directly on fabric tailored to templates of garments, such as a front body, a back body, or pockets. This method has a multitude of shortcomings and deficiencies. Prior to sewing the garments, for example, the parts of the garments on which embroideries are to be formed have to be sent in and out. This adds time and transportation costs to the embroidering process. Actual transportation processes also likely introduce inefficiencies, which inefficiencies, coupled with added processing time, lower production. Lowered production and increased costs directly cause lower profit margins.

Furthermore, at present, embroideries made by sewing machines must be reinforced to prevent defects due to differences in tension between upper and lower threads that are stitched together in an embroidered design. This reinforcement generally involves attachment of a non-woven fabric over the bottom threads, that is, generally on the inside of an embroidered garment. Many wearers of such garments find such covered bottom threads to be uncomfortable. Additionally, embroidering on such products as garments, hats and headgear, footwear, bags, cases, stationary and household items requires that the actual materials be brought into contact with the sewing machine. At best, such a process—involving bulky or odd-shaped articles in particular—is only inefficiently and unproductively accomplished; at worst embroidering may be impossible because of the inherent kind and nature of materials involved, or because of the shape of the products.

Another conventional method for producing an embroidered design on an article is to first embroider the design on a gauze-like material, which material is thereafter readily dissolved so as to leave only the embroidering thread which defines the design. Thereafter, the design can be sewn onto the article which it is intended to adorn. Like the first method discussed above, this method is cumbersome and expensive, and does not lend itself to any kind of efficient mass production technique.

Accordingly, there has arisen a need for a novel process for producing one or more embroidered designs, which process is susceptible to mass production, and which process produces designs that are efficiently transferrable to various articles including but not limited to such odd-shaped articles as those described above. Further, where multiple designs—which may be different from one another—are intended to be transferred simultaneously, it would be highly advantageous to be able to accurately control their positions, relative to one another as well as on the article, without sacrificing efficiency, productivity, or ease of operation.

Although various techniques which attempt to solve the problem of mass producing embroidered designs have been extant for some time, no such technique is known to have all of the advantages and novel features of the present invention described and claimed hereinbelow.

SUMMARY OF THE INVENTION

The present invention provides, in part, a novel process for producing one or more embroidered designs which are transferrable efficiently to various articles, without the shortcomings and deficiencies of the current methods. The present invention offers the possibility of embroidery without needing the actual material or product (hereinafter "article") to embroider on, by introducing a combination-layer structure hereinafter referred to as an "embroiderer." The embroiderer provided in accordance with the teachings of the present invention increases productivity, efficiency and ease of operation associated with mass production of articles with embroidered adornments.

In one aspect, the present invention is directed to an ornamental design transfer method for securing an ornamental design to an article, comprising the steps of: fabricating an embroiderer in accordance with the teachings of the present invention, which embroiderer includes the ornamental design; and transferring the design to the article using the embroiderer. The embroiderer fabricating step further comprises the steps of: forming the ornamental design on a base material; backing up the base material with a binder layer, which binder layer has an upper surface and a lower surface, wherein the lower surface is lined with a peel-off sheet and the upper surface is affixed to the base material; trimming portions of the base material and the binder layer around the ornamental design, thereby exposing a portion of the peel-off sheet; and affixing a protective layer having an adhesive coat on its lower surface, the protective layer substantially covering the ornamental design and binding to the exposed portion of the peel-off sheet. In accordance with the teachings of the present invention, the ornamental design may be transferred to an article in the following steps: removing the peel-off sheet from the embroiderer at room or ambient temperature; placing the embroiderer on the article after the removing step; hot-pressing the embroiderer on the article, whereby the design is glued onto the article; and detaching the protective layer.

In another aspect, the present invention relates to an embroiderer adapted for facilitating securement of a design to an article, comprising: a base material with an upper surface and a lower surface for forming at least one embroidery design thereon; a backup layer with first and second surfaces affixed to the base material, wherein the first surface of the backup layer is adhered to the lower surface of the base material and the second surface of the backup layer is lined with a peel-off sheet; and a protective layer with a top surface and a bottom surface affixed to a subcombination structure, which structure is formed by removing portions of the base layer and the backup layer around the embroidery designs such that only the embroidery designs and the base and backup layers thereunder are remaining on the peel-off sheet, wherein the bottom surface of the protective layer is coated with an adhesive film.

In a presently preferred exemplary embodiment, the peel-off sheet is removable at room temperature. Furthermore, the melting temperatures of the protective layer and the adhesive film are greater than that of the backup layer. It is presently preferred that the base material comprises an electro-heated cuttable synthetic resin film or a non-woven synthetic fiber fabric. The preferred base material is meltable by temperatures encountered during heat-cutting but sustained at temperatures applied in hot-pressing. The backup layer preferably comprises a thermoplastic binder. The protective layer, in a preferred exemplary embodiment, may comprise a transparent material having a visible grid on the top surface thereof for facilitating the accurate positioning of the embroidery designs on the article.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
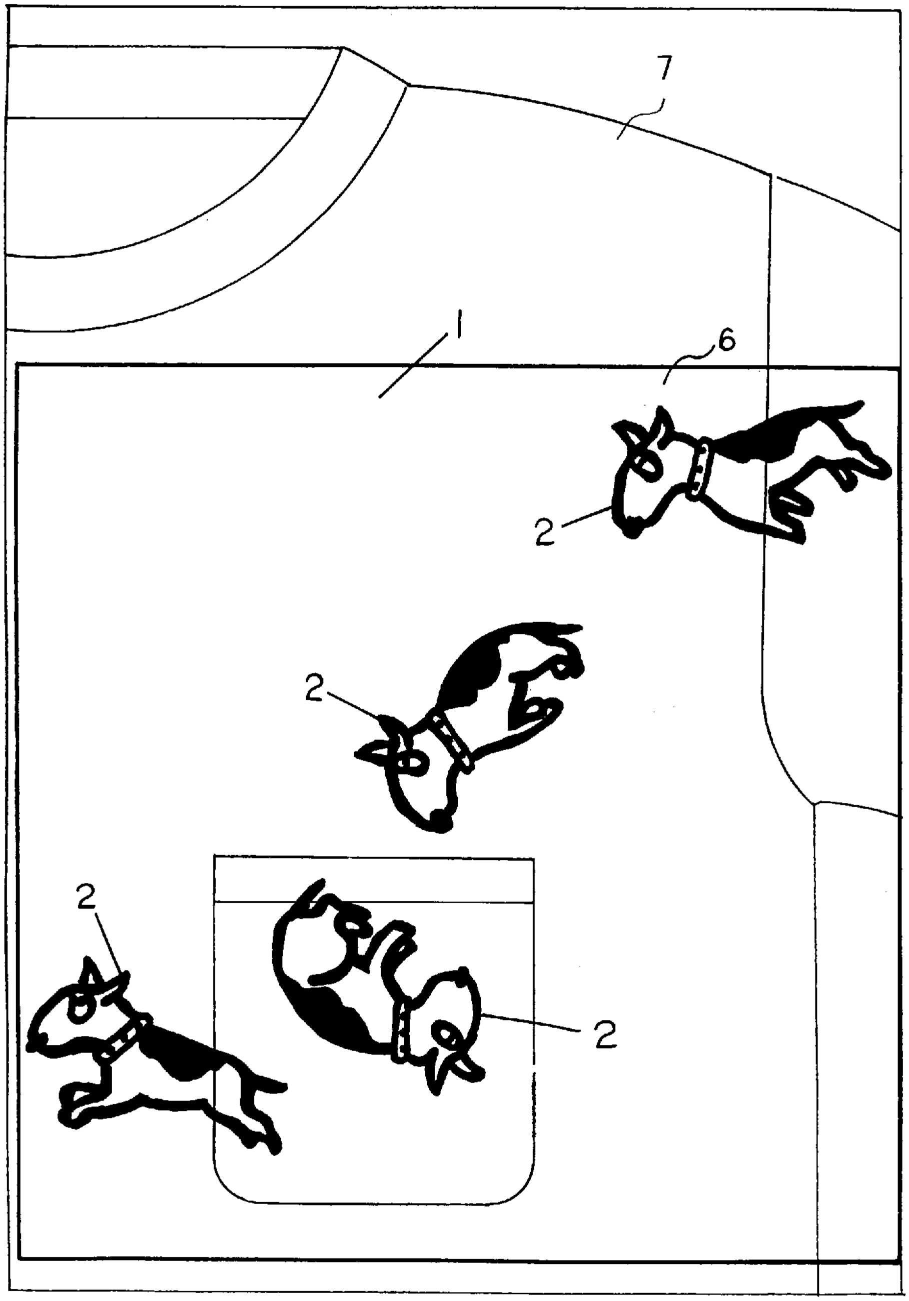
FIG. 1 is a top view of an exemplary embroiderer having a plurality of designs, provided in accordance with the teachings of the present invention.

Referring now to the drawings wherein like or similar elements are designated with identical reference numerals throughout the several views, and wherein the various elements depicted are not necessarily drawn to scale, and in particular to FIG. 1, there is shown an exemplary embroiderer 1 having a plurality of designs 2, provided in accordance with the teachings of the present invention. It should be understood that although the exemplary embroiderer 1 is depicted to comprise a plurality of designs 2, it may have only one design or it may have several different designs.

The exemplary embroiderer 1 can be seen in the top view to comprise a protective layer 6. Preferably, the protective layer comprises a transparent layer that is resistant to heat and temperature. As will be seen below, the protective layer 6 covers various structures lying thereunder provided in accordance with the teachings of the present invention.

The exemplary embroiderer 1 may be positioned on an article 7 for transferring or securing the designs 2 thereto in accordance with the teachings of the present invention. Although the exemplary embroiderer 1 is made of continuously sewn embroideries on a base material, a single embroidery design may be used for transferring or securing the same to a number of articles such as, for example, various clothing products and garments, hats and headgear, footwear, bags, cases, telegram messages and other stationery, curtains and other household items, et cetera.

Referring now to FIGS. 2A–2D, sectional views of an exemplary embroiderer are depicted for delineating the steps of forming the various constituent layers thereof in accordance with the teachings of the present invention. One or more ornamental designs (hereinafter, simply "designs") 2 are preferably formed by sewing machines on a base material 3 at predetermined positions such that the underthreads 2*b* stitch the underside 3*b* of the base material 3. Preferably, the base material comprises an electro-heated cuttable synthetic resin film or non-woven fabric of synthetic fiber. Thinner material may be preferred provided it is strong and firm enough to sustain the tension of the stitches by the needle of the sewing machine. Furthermore, as to the thermal properties of the base material 3, it should be easily meltable by a heat-cutting process (described hereinbelow) but sustainable (that is, not deformable or alterable in any way so as to detract from its inherent aesthetic appearance) at the temperatures and pressure ranges that may be applied in the step of transferring or securing, or both transferring and securing, the designs 2 onto an article.

It should be understood by those skilled in the art that the base material 3 can be any material having a smooth surface or mesh. In a presently preferred exemplary embodiment of the present invention, a fine mesh material of synthetic yarn is recommended because it holds the tension of embroidery stitches and maintains the designs 2 clearly and distinctly.

Figure 2A:
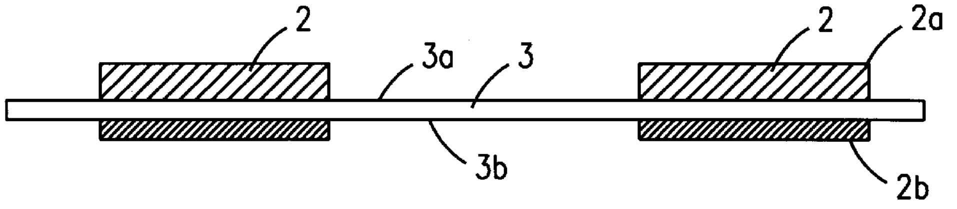
FIGS. 2A–2D are sectional views of the exemplary embroiderer, depicting the steps of forming the various constituent layers thereof in accordance with the teachings of the present invention.
Figure 2B:
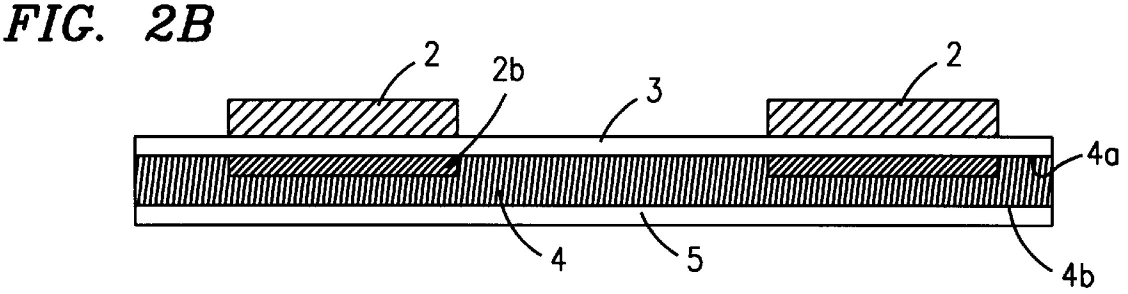

Referring now to FIG. 2B specifically, the base material 3 with the design or designs 2 is backed up with a backup layer 4 having first and second surfaces 4*a* and 4*b*. The backup layer 4 preferably comprises a thermoplastic binder material wherein the first surface 4*a* is affixed to the lower surface 3*b* of the base layer 3 and the second surface 4*b* is lined with a peel-off sheet 5. Furthermore, it is preferred that the peel-off sheet 5 be easily removable at room or ambient temperature for facilitating the step of transferring the designs 2 onto the article.

Various methods of backing up the base material 3 with the binder material 4 may be employed within the scope of the present invention. For example, a liquiform binding material may be directly applied onto the peel-off sheet 5. Afterwards, the base material 3 with the design or designs 2 may be heat-pressed on the previously-made binder and peel-off combination. It should be appreciated by those skilled in the art that although the backing up of the base material 3 with the binder material 4 may be accomplished in several ways, it is presently preferred that the binder material be thermoplastic and that it possess physical and chemical properties that impart a soft and smooth finish, especially on the article after securing or transferring, or both securing and transferring, the designs 2 thereto.

Figure 2C:
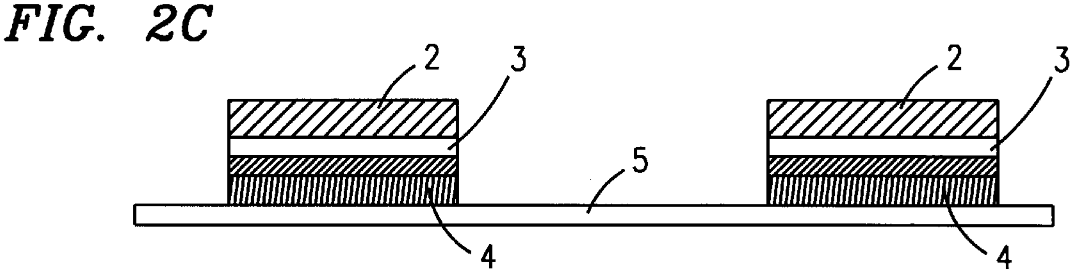

Referring now to FIG. 2C specifically, the subcombination layer structure comprising the base material 3 and the backup layer 4, described hereinabove with respect to FIG. 2B, is then subjected to a cutting/trimming step, preferably aided by heat in a heat-cutting apparatus. As can be readily seen, those portions of the base material 3 that do not bear the design or designs 2 and the portions of the binder material 4 lying thereunder are removed or trimmed off such that preferably only the peel-off sheet 5 is left intact. That is, after this step, only the designs 2 and design-bearing portions of the base material 3 and underlying binder material 4 are present on the peel-off sheet. It should be understood that there is no requirement under the teachings of the present invention that the edges of the remaining portions of the base material 3 and the binder 4 be flush with the edges of the designs 2.

Figure 2D:
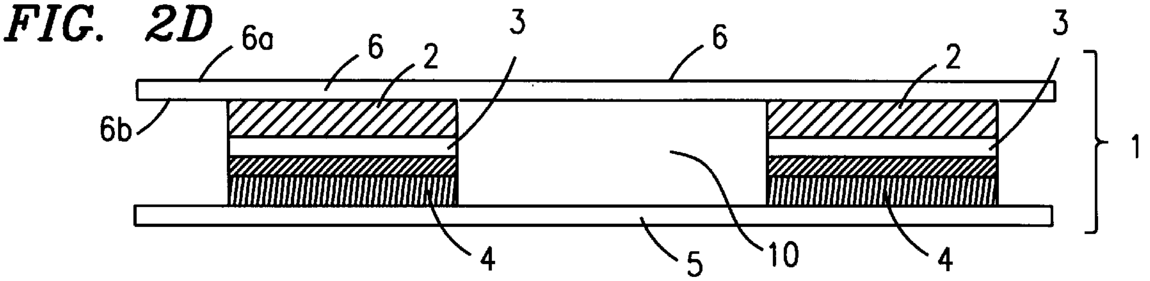

Referring now to FIG. 2D specifically, a protective layer 6 with top and bottom surfaces, 6*a* and 6*b* respectively, is affixed over the designs 2 and the peel-off sheet 5. The protective layer preferably comprises a heat- and pressure-resistant film. Further, the bottom surface 6*b* is coated with an adhesive coat (not shown) that is also heat-resistant. It is preferred that the melting temperatures of the protective layer 6 and the adhesive coat are at least greater than that of the binder material 3. It should be understood that although there is shown a spatial gap 10 between the protective layer 6 and the peel-off sheet 5, no such gap may exist in ordinary practice as these two structures abut each other and the designs 2 may be very thin and flat.

The combination-layer structure produced in accordance with the foregoing description may be referred to as an embroiderer 1. Before transferring and/or securing the designs 2 onto the article 7 (shown in FIG. 1), the peel-off sheet 5 is removed, preferably at room temperature or ambient temperature. It can be seen that even after the removal of the peel-off sheet 5, the intended layout of the design or designs 2 is firmly kept intact by the protective layer 6. After placing the embroiderer on the article 7, a hot-ironing or hot-pressing step is applied thereover. The preferred temperature ranges for this step are such that while the thermoplastic binder material 4 melts and is affixed to the article 7 during this step, the protective layer 6 and the adhesive coat on its bottom surface 6*b* continue to retain their thermal integrity. It is preferred that their respective melting temperatures be at least sufficiently greater than the hot-pressing temperatures so that they do not become "sticky" or otherwise affected, thereby detracting from the aesthetic appearance of the designs 2 when the protective layer 6 is removed or detached afterwards. Further, the temperatures to be encountered during the hot-pressing step are preferably not sufficient to melt or otherwise compromise the base material 3.

In a presently preferred exemplary embodiment of the embroiderer 1 provided in accordance with the teachings of the present invention, the protective layer 6 is preferably transparent such that the positioning of the designs 2 on the article 7 may be accurately and easily controlled by an operator before transferring or securing, or both, the designs 2 thereto. Further, by providing a visible grid, preferably of square scales, on the top surface 6*a* of the transparent protective layer 6, the positioning of the design or designs 2 on the article 7 or with respect to each other, if there is more than one design, becomes highly controllable with ease.

Based upon the foregoing description, it should now be appreciated by those skilled in the art that the embroiderer of the present invention imparts decorative effects to an article that are more striking and more stable than conventional needle work, yet is highly amenable to mass production techniques. The embroiderer of the present invention provides a method for decorating various articles, including those that have heretofore been impractical or unsuitable for mass production, that is superior to the traditional direct embroidery methods. These direct embroidery methods employ needles that stitch into the backside of the article material and the supporting material underneath, thereby rendering the embroidery heavy and uncomfortable to wear. Conversely, the embroiderer of the present invention retains the under thread that remains on top of the articles, yet it is tightly interlocked with the upper thread to contribute to the three-dimensional effect of the embroidery. It can be readily appreciated that the embroiderer-based design transfer is far more attractive than usual appliqués or Wappens-emblems.

In the case of two or more designs that are to be transferred together to an article, the present invention provides for the positioning of the designs that is easy yet highly accurate. Moreover, transferring different designs in accordance with the teachings of the present invention does not negatively impact high productivity that may be necessary for a profitable manufacturing process. Because the design-bearing embroiderer is produced separately and independently, there is no need for waiting for the supply of the actual articles or portions thereof such as the front bodies, pockets, sleeves, the front portions of trousers, et cetera. It can be readily appreciated that the present invention provides an option to put embroidery on pre-cut materials of the articles. Accordingly, a manufacturer need not keep huge inventories of the articles that need embroidered designs. Furthermore, because of this efficiency, manufacturers can avoid market risks associated with such huge inventories. At the same time, the manufacturers can concentrate the production capacity on actual demand based on popular designs rather than speculation. Hence, it should be appreciated that the present invention helps reduce traditional trade risk and assures high profitability by minimizing the loss of bargain-selling after the selling season is over.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An ornamental design transfer method for securing an ornamental design to an article, comprising the steps of:

fabricating an embroiderer, said embroiderer including said ornamental design, by forming said ornamental design on a base material;

backing up said base material with a binder layer, said binder layer having an upper surface and a lower surface, wherein said lower surface is lined with a peel-off sheet and said upper surface is affixed to said base material;

trimming portions of said base material and said binder layer around said ornamental design, thereby exposing a portion of said peel-off sheet; and affixing a protective layer having an adhesive coat on its lower surface, said protective layer substantially covering said ornamental design; and transferring said ornamental design to said article using said embroiderer.

2. The method as set forth in claim 1, wherein said trimming step is performed by heat-cutting.

3. The method as set forth in claim 2, wherein said transferring step further comprises the steps of:

removing said peel-off sheet from said embroiderer at an ambient temperature;

placing said embroiderer on said article;

hot-pressing said embroiderer on said article, whereby said ornamental design is glued onto said article; and detaching said protective layer.

4. The method as set forth in claim 1, wherein the melting temperatures of said protective layer and said adhesive coat are greater than that of said binder.

5. The method as set forth in claim 3, wherein said base material is meltable by said heat-cutting step but sustainable at said hot-pressing step.

6. The method as set forth in claim 1, wherein said step of forming is done on a sewing machine.

7. The method as set forth in claim 1, wherein the melting temperature of said adhesive coat is approximately around 200° C.

8. The method as set forth in claim 3, wherein said hot-pressing step is performed approximately at around 130° C.

9. An embroiderer adapted for facilitating securement of a design to an article, comprising:

a base material with an upper surface and a lower surface for forming at least one embroidery design thereon;

a backup layer with first and second surfaces affixed to said base material, wherein said first surface of said backup layer is adhered to said lower surface of said base material and said second surface of said backup layer is lined with a peel-off sheet; and a protective layer with a top surface and a bottom surface affixed to a subcombination structure, which structure is formed by removing portions of said base layer and said backup layer around said at least one embroidery design such that only said at least one embroidery design and said base and backup layers thereunder are remaining on said peel-off sheet, wherein said bottom surface is coated with an adhesive film.

10. The embroiderer as set forth in claim 9, wherein said peel-off sheet is removable at room temperature.

11. The embroiderer as set forth in claim 9, wherein the melting temperatures of said protective layer and said adhesive film are greater than that of said backup layer.

12. The embroiderer as set forth in claim 9, wherein said base material comprises an electro-heated cuttable synthetic resin film.

13. The embroiderer as set forth in claim 9, wherein said base material comprises an electro-heated cuttable non-woven synthetic fiber fabric.

14. The embroiderer as set forth in claim 9, wherein said base material comprises a fine mesh material.

15. The embroiderer as set forth in claim 9, wherein said backup layer comprises a thermoplastic binder.

16. The embroiderer as set forth in claim 9, wherein said protective layer comprises a transparent material having a visible grid on said top surface of said protective layer for facilitating the accurate positioning of said at least one embroidery design on said article.

17. The embroiderer as set forth in claim 9, wherein said at least one embroidery design comprises a design formed by a sewing machine.

18. The embroiderer as set forth in claim 9, wherein the melting temperature of said adhesive film is approximately around 200° C.

19. A pattern transfer method adapted for use with an article, comprising the steps of:

fabricating an embroiderer, said embroiderer including at least one ornamental design, by forming said at least one ornamental design on a base material;

backing up said base material with a binder layer, said binder layer having an upper surface and a lower surface, wherein said lower surface is lined with a peel-off sheet and said upper surface is affixed to said base material;

trimming portions of said base material and said binder layer around said at least one ornamental design, thereby exposing a portion of said peel-off sheet; and affixing a protective layer with upper and lower surfaces, having an adhesive coat on said lower surface, said protective layer substantially covering said at least one ornamental design; and transferring said at least one ornamental design to said article using said embroiderer.

20. The method as set forth in claim 19, wherein said trimming step is performed by heat-cutting.

21. The method as set forth in claim 20, wherein said transferring step further comprises the steps of:

removing said peel-off sheet from said embroiderer at an ambient temperature;

placing said embroiderer on said article;

hot-pressing said embroiderer on said article, whereby said at least one ornamental design is glued onto said article; and detaching said protective layer.

22. The method as set forth in claim 19, wherein the melting temperatures of said protective layer and said adhesive coat are greater than that of said binder.

23. The method as set forth in claim 21, wherein said base material is meltable by said heat-cutting step but sustainable at said hot-pressing step.

24. The method as set forth in claim 19, wherein said step of forming is done on a sewing machine.

25. The method as set forth in claim 19, wherein the melting temperature of said adhesive coat is approximately around 200° C.

26. The method as set forth in claim 21, wherein said hot-pressing step is performed approximately at around 130° C.

27. The method as set forth in claim 19, wherein said protective layer comprises a transparent material.

28. The method as set forth in claim 27, wherein said upper surface of said protective layer includes a grid for facilitating the accurate positioning of said at least one ornamental design.

* * * * *